United States Patent
Nakamura et al.

(10) Patent No.: US 6,364,796 B1
(45) Date of Patent: Apr. 2, 2002

(54) BLADE CHAIN TENSIONER

(75) Inventors: Kensuke Nakamura; Ryohei Adachi, both of Wako; Naosumi Tada; Shinji Tsuruta, both of Mie, all of (JP)

(73) Assignee: Borg-Warner Automotive K.K., Nabari (JP)

( * ) Notice: Subject to any disclaimer, the term of this patent is extended or adjusted under 35 U.S.C. 154(b) by 0 days.

(21) Appl. No.: 09/482,223

(22) Filed: Jan. 13, 2000

(30) Foreign Application Priority Data

Feb. 16, 1999 (JP) .......................................... 11-036886

(51) Int. Cl.$^7$ ................................................. F16H 7/00
(52) U.S. Cl. ....................................................... 474/111
(58) Field of Search ................................ 474/111, 146, 474/101

(56) References Cited

U.S. PATENT DOCUMENTS

| | | | |
|---|---|---|---|
| 3,358,522 A | * 12/1967 | Poyser et al. ................ | 474/111 |
| 3,490,302 A | 1/1970 | Turner et al. | |
| 4,921,472 A | 5/1990 | Young | |
| 5,055,088 A | 10/1991 | Cradduck et al. | |
| 5,266,066 A | 11/1993 | White | |
| 5,286,234 A | 2/1994 | Young | |
| 5,318,482 A | * 6/1994 | Sato et al. .............. | 474/140 X |
| 5,425,680 A | 6/1995 | Young ......................... | 474/111 |
| 5,462,493 A | 10/1995 | Simpson | |
| 5,711,732 A | 1/1998 | Ferenc et al. ............... | 474/111 |
| 5,797,818 A | * 8/1998 | Young ......................... | 474/111 |
| 5,820,502 A | * 10/1998 | Schulze ....................... | 474/140 |
| 5,957,793 A | * 9/1999 | Schulze ................... | 474/111 X |
| 5,984,815 A | 11/1999 | Baddaria | |
| 6,013,000 A | * 1/2000 | Moretz ........................ | 474/111 |
| 6,086,498 A | * 7/2000 | Hashimoto ................... | 474/111 |
| 6,095,938 A | * 8/2000 | Kumakura ................... | 474/111 |

FOREIGN PATENT DOCUMENTS

| | | | | |
|---|---|---|---|---|
| DE | 3525746 A1 | * 1/1987 | .................. | 474/111 |
| DE | 4310306 A1 | * 10/1994 | .................. | 474/111 |
| EP | 0 581 219 | 2/1994 | | |
| EP | 0 867 600 A3 | 3/1999 | ............. | F01L/1/02 |
| FR | 1391482 | 6/1965 | | |
| JP | 10-103435 | 4/1998 | ............. | F16H/7/18 |
| WO | WO 00/47914 | 8/2000 | ............. | F16H/7/08 |

OTHER PUBLICATIONS

European Search Report dated Mar. 3, 2001 for EP Applc. No. 00300922.2–2306.

* cited by examiner

*Primary Examiner*—David A. Bucci
*Assistant Examiner*—Colby Hansen
(74) *Attorney, Agent, or Firm*—Fitch, Even, Tabin & Flannery; Greg Dziegielewski

(57) ABSTRACT

A blade-type tensioner for chain drives which is suitable for use as a tensioner on the timing chain of a motor vehicle engine. The present invention is a chain tensioner particularly suited for use in confined spaces having a blade spring element mechanically interlocked with a plastic shoe. The shoe may be of rigid filled nylon and engages the chain to be tensioned. The spring element is interlocked to the plastic shoe by having ends inserted into grooves formed in the opposite ends of the shoe. The shoe is rotatably fixed to a base by way of a pin. The groove at the fixed end of the shoe extends towards the tip of the fixed end of the shoe past the pin attachment point. The groove at the free end of the shoe extends toward the tip of the free end of the shoe past the point at which the free end of the shoe bears upon a sliding surface formed on the base.

6 Claims, 4 Drawing Sheets

BLADE CHAIN TENSIONER

BACKGROUND OF THE INVENTION

This invention relates generally to a chain tensioner for chain drives which is particularly, though not exclusively, suitable for use as a tensioner on the timing chain of a motor vehicle engine. The present invention is a chain tensioner particularly suited for use in confined spaces having a flat blade spring element mechanically interlocked with a plastic shoe. The shoe may be of rigid filled nylon and engages the chain to be tensioned.

Conventionally, a blade tensioner is used as the tensioner to apply tension force onto a chain. One form of prior art blade chain tensioner is shown in U.S. Pat. No. 3,490,302, which is incorporated herein by reference. Another example of a blade tensioner is shown in FIG. 4 and FIG. 5 herein.

As shown in FIG. 4, the conventional blade tensioner 100 is composed of a shoe 101 made of resin that extends in an arc form, multiple blade springs 102 that extend along shoe 101 and are mounted on shoe 101, and a metal base 120 that rotatably supports one end of shoe 101.

A first projecting portion 110 is formed at the tip or free end of shoe 101. Distal groove 111, for housing one end of blade spring 102, is formed in the projecting portion 110. A second projecting portion 112 is formed on the fixed end of shoe 101. Proximal groove 113, for housing the other end of blade spring 102, is formed in the second projecting portion 112.

Attachment holes 121, 122 are formed on base 120. Sliding surface 125, the curved surface 110a of which is formed in projecting portion 110 at the free end of shoe 101, and which can slide in contact, is formed at the tip of base 120. One end of metal pin 130 is fixed at the center of base 120. Pin 130 passes through projecting portion 112 on the fixed end of shoe 101 and a stop ring (not shown) for shoe 101 is mounted on the free end of the shoe. The shoe 101 is thus rotatable around pin 130.

In operation, the chain runs on sliding surface 101a of shoe 101, and a pressure load from blade spring 102 (see FIG. 5) acts on the chain via shoe 101. However, in the conventional blade tensioner, projecting portion 112 on the fixed end of the shoe moves in the direction of arrow a as shoe 101 deforms from a small radius curvature, shown in FIG. 4, to a large radius curvature, as shown in FIG. 5 in shoe 101. As a result, the degree of opening of the proximal groove 113 increases. When the degree of opening of proximal groove 113 changes, the contact position of the end part of blade spring 102 with groove 113 changes and the operation of the blade shoe is adversely affected causing deterioration of the response of the blade tensioner.

Similarly, for projecting portion 110 on the free end of shoe 101, the contact position of the end part of blade spring 102 with distal groove 111 changes when the degree of opening of the open part of distal groove 111 changes due to deformation of shoe 101. Accordingly, the operation of the blade shoe can be adversely affected.

The stiffness of shoe 101 cannot be made high in automotive applications where the temperature change is large, because a large bending stress acts at the portion of shoe 101 shown at the arrow A when shoe 101 deforms.

This invention addresses such conventional problems and offers a blade tensioner that provides reduced deterioration of tensioner response and improves durability.

SUMMARY OF THE INVENTION

The blade tensioner of one embodiment of the present invention includes a blade tensioner that applies tension force to a chain. The blade tensioner has a base or bracket and a chain contacting surface over which the chain slides. The chain contacting surface is a surface portion of a resin or plastic shoe having an arcuate shape. The shoe is made of a material which will "creep." "Creep" is the term used in the art to describe the tendency of the shoe to plastically deform in a gradual manner under elevated load and temperature. The fixed or proximal end of the shoe is rotatably mounted to a metal pin. The pin is fixed to the base. The free end or distal part of the shoe slides freely on an adjacent slide surface formed on the base. A flat blade spring or multiple blade springs are positioned on the side of the shoe opposite the chain-contacting surface. The springs have ends inserted into grooves, slots or housings formed in the ends of the shoe. The proximal groove which receives the blade springs in the fixed end of the shoe extends longitudinally toward the tip of the fixed end of the shoe beyond the point where the pin passes through the shoe.

The blade tensioner of a second embodiment includes a blade tensioner to apply tension force to a chain. The blade tensioner is mounted to a base and has a chain sliding surface over which the chain slides. The sliding surface forms a portion of a shoe and has an arcuate shape. The free end of the shoe slides on a slide surface formed in the base. The fixed end of the shoe is mounted rotatably around a metal pin that is fixed to the base. The shoe is kept under load by a blade spring, the ends of which are inserted in a proximal and distal groove formed in the fixed end and the free end of the blade shoe respectively. The distal groove on the free end of the shoe extends longitudinally toward the tip of the free end of the shoe beyond the contact point between the free end of the shoe and the sliding surface of the base.

The blade tensioner of a third embodiment has blade springs whose ends contact a side of the proximal groove at a point which is located longitudinally beyond the attachment position of the pin in a direction toward the tip of the fixed end of the shoe.

The blade tensioner of a fourth embodiment has blade springs whose ends contact a side of the distal groove at a point which is located longitudinally beyond the contact point between the free end of the shoe and the sliding surface of the base.

The blade tensioner of a fifth embodiment, has a concave relief portion or channel formed in the proximal and distal grooves for preventing contact between the blade spring ends and the shoe.

The blade tensioner of a sixth embodiment has a concave space or opening that extends across the width or transverse direction of the blade shoe formed in the fixed and the free ends of the shoe. The concave space may be filled with fiber-reinforced resin.

The blade tensioner of a seventh embodiment has a guide portion that guides the free end of the blade shoe on the sliding surface. The guide portion extends from the edges of the sliding surface of the base. The guide part is provided on both sides in the width direction of the sliding surface and has convex curved members adjacent the blade shoe.

In the present invention, in one or more embodiments, the proximal groove on the fixed end of the blade shoe opens past the pin attachment point and extends further toward the tip of the fixed end of the shoe. Thereby, the degree of opening of the groove opening does not change greatly when the blade shoe deforms and, as a result, the change of the contact point between the groove and the end of the blade spring is reduced. Furthermore, deterioration of the response of the blade tensioner is reduced in this manner. In this case, generation of excessive bending stress in the blade shoe is prevented so that the durability of the blade tensioner is improved.

As for the distal groove on the free end of the blade shoe, it is also preferred that it extends past the contact point between the free end of the shoe and sliding surface or face on the base and extends further in a longitudinally outward direction. In this case, the change of the contact point between the tip of the blade spring and groove is reduced even when the degree of groove opening changes, so that an adverse effect on the operation of the blade shoe is reduced and deterioration of the response of the blade tensioner is reduced.

It is preferable that the contact point of the blade spring with the groove in the fixed end of the shoe is closer to the tip of the fixed end than the pin attachment point. In this case, opening of the groove on the fixed end of the blade shoe can be reduced or eliminated.

In addition, it is preferable, in the distal groove on the free end of the blade shoe, that the contact point between the blade spring and free end is located further toward the tip of the free end of the shoe than the contact point between the free end of the shoe and the sliding surface of the base. In this case, opening of the distal groove can be reduced or eliminated when the blade shoe deforms.

It is preferable to have a relief point or concavity formed in the shoe adjacent the ends of the blade springs. The concavity is a concave channel formed transversely across the grooves in both ends of the shoe. This concave relief channel prevents interference of the end of the blade spring with the blade shoe and defective operation of the blade spring during operation of the tensioner is prevented. Thereby, the deterioration of response of the blade tensioner can be prevented. In addition, in such a case, wear of the contact part of the blade shoe with the end of the blade spring is prevented, so that the durability of the tensioner is improved.

Formation of a concave space or opening that extends in the width direction of the blade shoe at the fixed and free ends is preferable and the weight of the blade shoe is reduced by it and response of the tensioner is improved. In addition, filling of the concave space with fiber-reinforced resin is preferable, and improves the buckling strength of the ends of the blade shoe.

It is preferable to provide a guide element that guides the sliding of the free end blade shoe on the sliding surface. The guide element is attached to the sides to the sliding surface of the base. It is preferable that this guide element be provided on both widthwise sides of the sliding surface and a convex curved surface be formed on the surface of each guide element adjacent the sides of the free end of the shoe. Thereby the sliding resistance between the guide element and the blade shoe is reduced and smooth movement of the blade shoe is realized.

For a further understanding of the present invention and the objects thereof, attention is directed to the drawings and the following brief description thereof, to the detailed description of the preferred embodiments of the invention and to the appended claims.

DETAILED DESCRIPTION OF THE PREFERRED EMBODIMENTS

Figure 1:
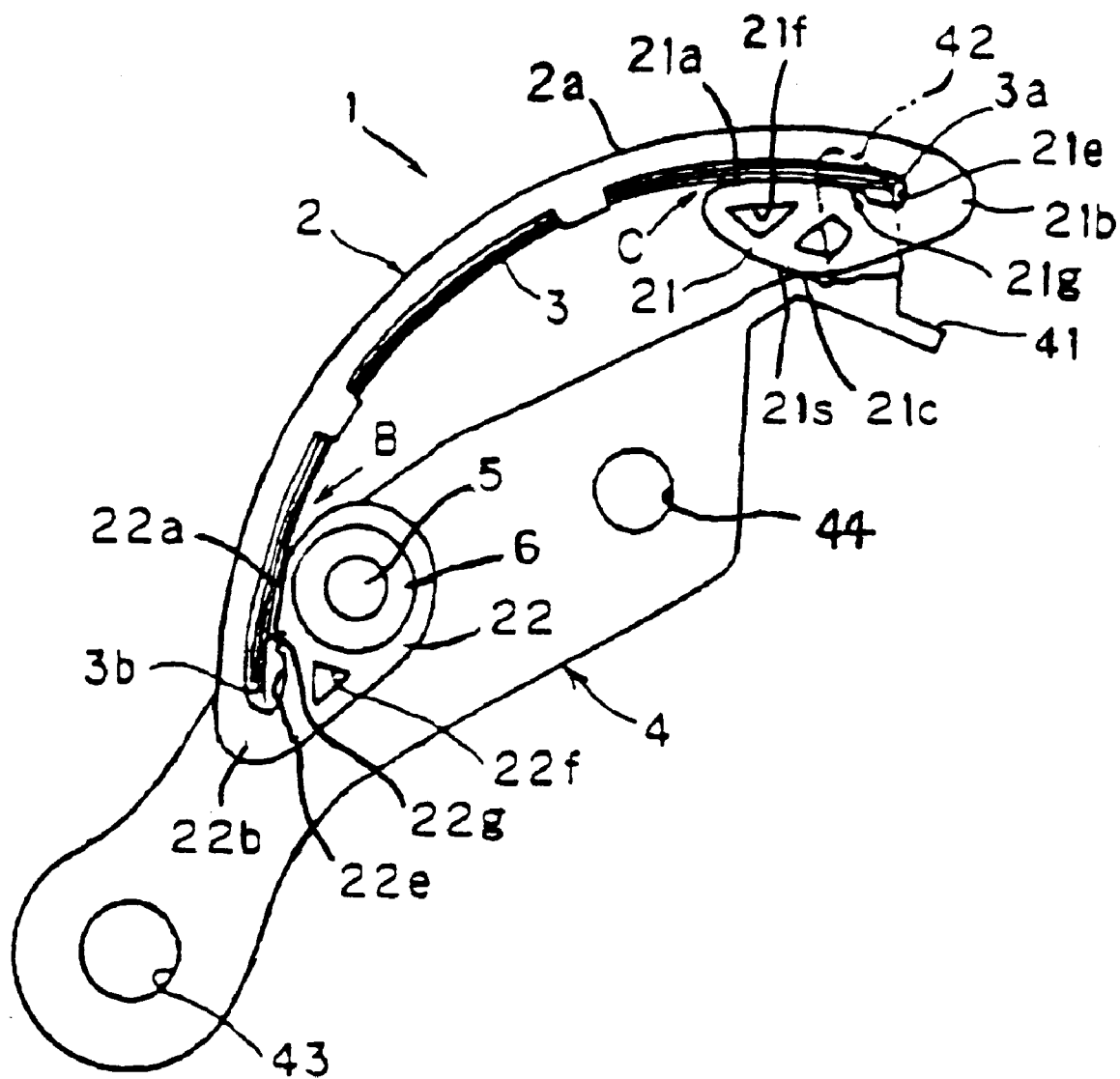
FIG. 1 is a side view of the blade tensioner of the present invention.
Figure 2:
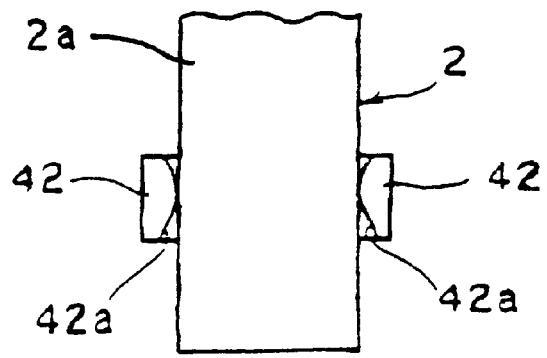
FIG. 2 is a plan view of a free end of a shoe of the blade tensioner of FIG. 1.
Figure 3:
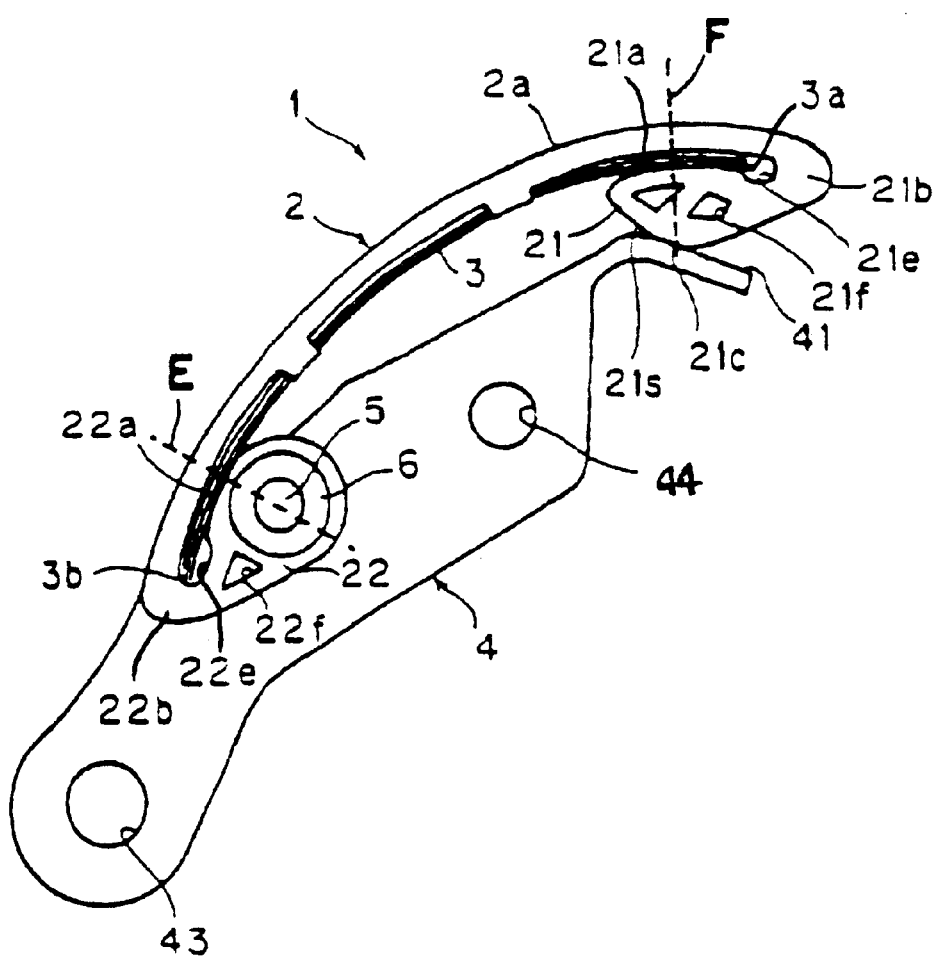
FIG. 3 is a side view the blade tensioner of the present invention.
Figure 4:
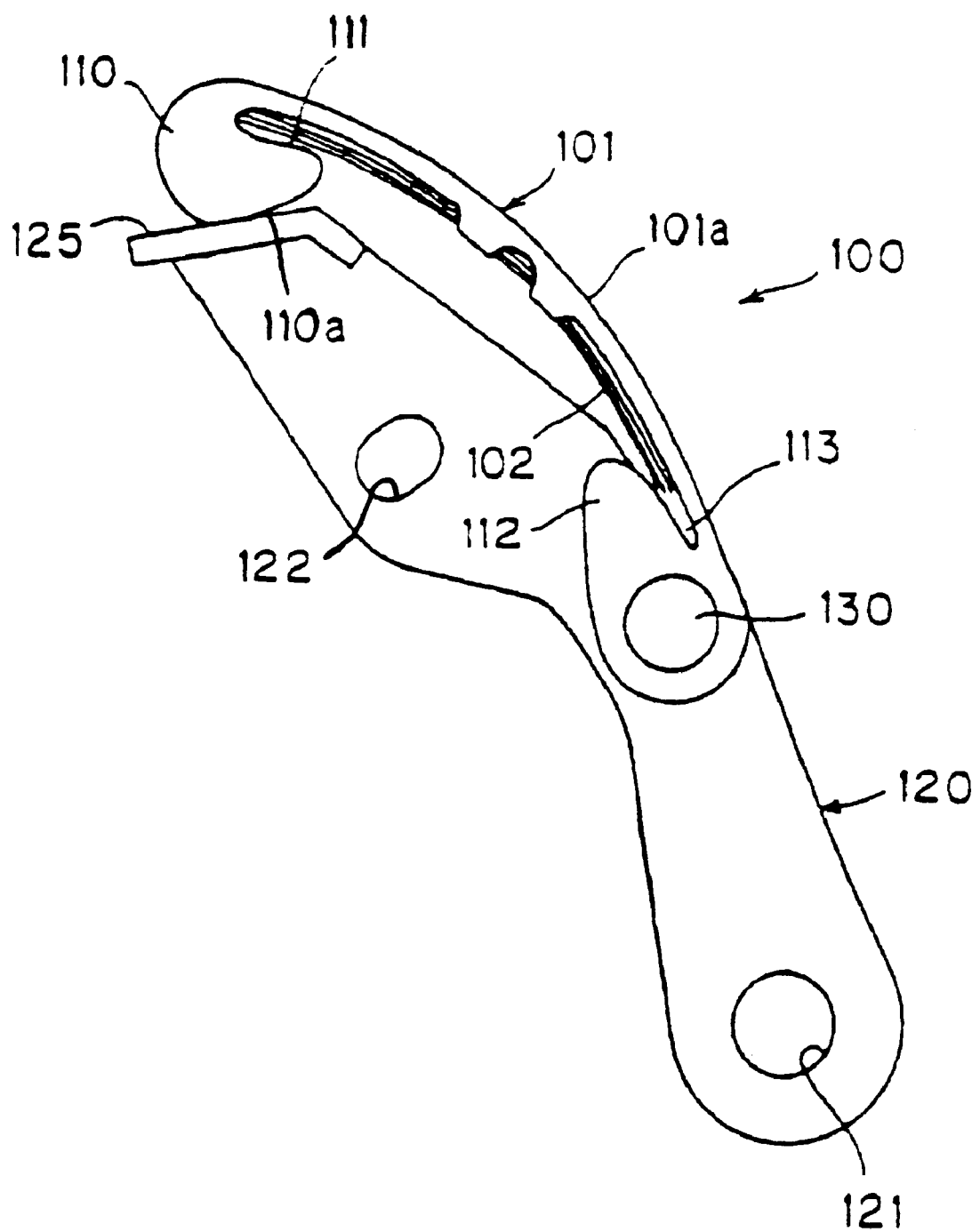
FIG. 4 is a side view of a prior art blade tensioner.
Figure 5:
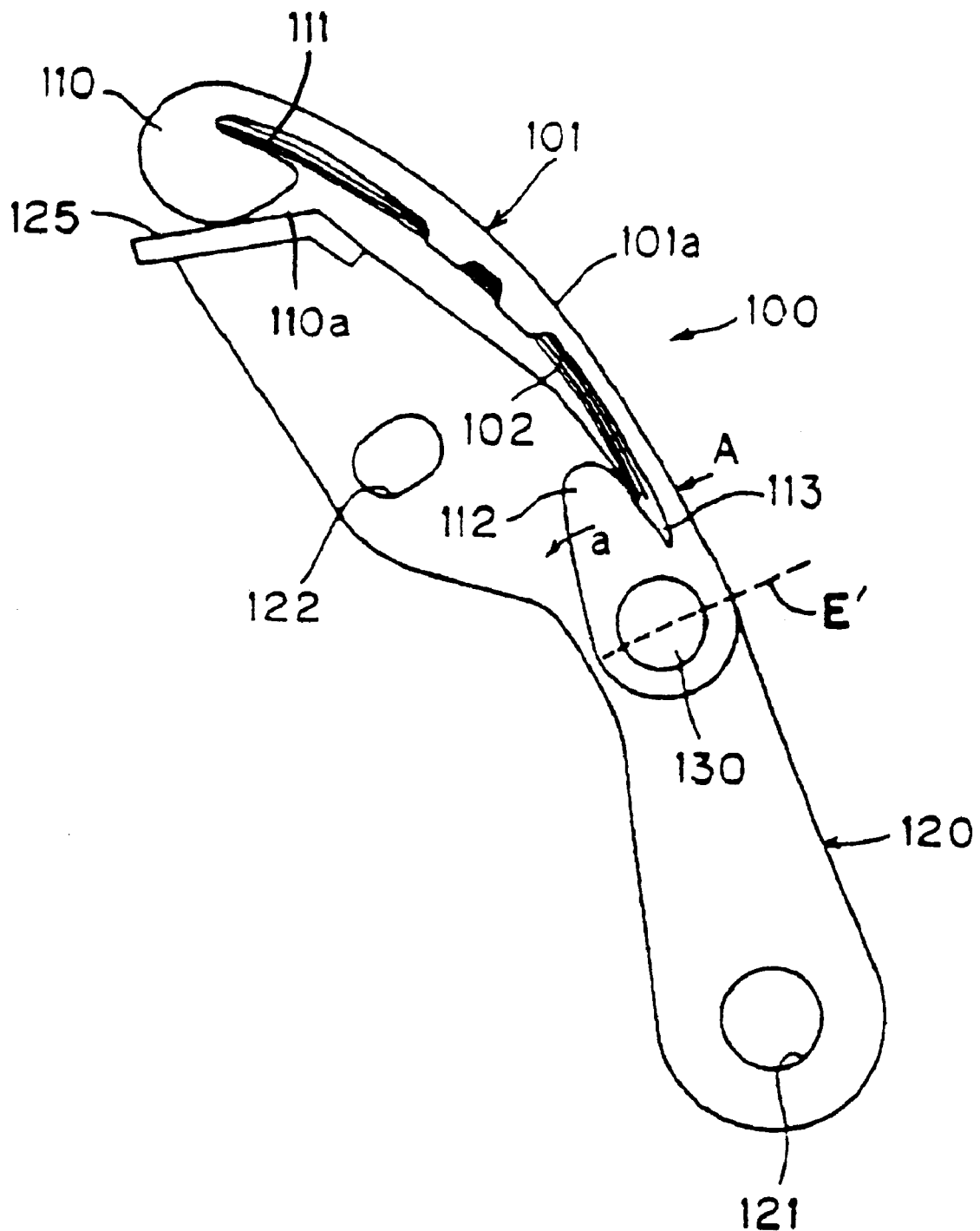
FIG. 5 is a side view of the blade tensioner of FIG. 4.

The embodiment mode of this invention is explained below with the aid of the attached figures. FIG. 1 is a side view of a blade tensioner of the present invention. FIG. 2 is a view along the line described by arrow II of FIG. 1. FIG. 3 illustrates the operation of the blade tensioner.

As shown in FIG. 1, blade tensioner 1 has a chain sliding surface 2a on which the chain slides, a shoe 2 having an arcuate form, multiple sheet spring-like blade springs 3 mounted along the curved direction of the blade shoe 2 on the side opposite to the chain sliding surface 2a of the blade shoe 2, and a metal base 4 that supports blade shoe 2. Attachment holes 43, 44 are formed on the base 4.

A projecting portion 21 of the shoe is provided on the free end of the blade shoe 2 and an arcuate surface 21s is formed in the projecting part 21. On the other hand, flat sliding surface 41 is formed at the tip of base 4 and the curved surface 21s of projecting part 21 of blade shoe 2 and the surface 21s is made so that curved surface 21s of projecting part 21 of blade shoe 2 can slide on sliding surface 41 while in contact with sliding surface 41 at a point 21c. Distal groove 21a is formed in projecting part 21. The end of each blade spring 3 is inserted in distal groove 21a and it is in contact with the shoe inside the groove at point 21g.

Projecting portion 22 is provided on the fixed end (opposite the free end) of blade shoe 2 and proximal groove 22a is formed in the projecting portion 22. The end of each blade spring 3 is inserted in groove 22a and it is in contact with proximal groove 22a at point 22g.

On the other hand, one end of pin 5 is fixed near the center of base 4 and pin 5 penetrates projecting portion 22 of blade shoe 2. Blade shoe 2 is supported rotatably by this pin 5. Stopper washer 6, for blade shoe 2, is fixed to the tip of pin 5 to prevent the shoe from becoming detached from the pin.

Groove 22a, formed in projection part 22 on the base side of blade shoe 2, goes over the attachment point of pin 5 and extends to the side of lip part 22b of projection part 22 that is the side of tip part 22b on the side of the other end of blade shoe 2. Concave relief part 22e is formed in the groove 22a to avoid contact with rear end 3b of blade spring 3. Between blade spring 3 and groove 22a, contact point 22g is located further on the side of tip part 22b of projection part 22 than the attachment point of pin 5.

Distal groove 21a formed in projecting portion 21 on the free end of blade shoe 2 extends to contact point 21c of projecting portion 21 and extends further in a longitudinal direction toward the tip part 21b, i.e., on the endmost portion of the free end of blade shoe 2. A concave channel or relief part 21e is formed transversely across distal groove 21a to avoid contact of tip 3a of blade spring 3 with distal groove 21a. Contact point 21g, between blade spring 3 and distal groove 21a, is located past a line drawn perpendicular to the longitudinal axis of the blade springs through the contact point 21c of projecting portion 21 with sliding surface 41.

Concave spaces 21f, 22f that extend in the transverse or width direction of the blade shoe are formed in projection parts 21, 22 of blade shoe 2. Formation of these concave spaces 21f, 22f reduce the weight of blade shoe 2 and response of the tensioner is improved.

Glass fiber reinforced resin FRP (Fiber Reinforced Plastic) can be filled into the concave spaces 21f, 22f. In such a case, the buckling strength of projection parts 21, 22 can be improved further.

As shown in FIG. 2, a pair of guides 42, located at both widthwise sides of blade shoe 2, are provided to sliding surface 41 of base 4. These guides 42 guide the sliding of projecting portion 21 of blade shoe 2 on sliding surface 41. In order to reduce the sliding resistance between the surface and blade shoe 2, convex curved surface 42a is formed on the side of each guide 42 adjacent blade shoe 2. Smooth movement of blade shoe 2 is realized by these convex curved surfaces 42a and the wear on these parts can be reduced because convex curved surface 42a contacts the tip of the blade spring 3.

When in operation, a chain (not shown) runs on the chain sliding surface 2a of blade shoe 2. As shown in FIG. 3, chain sliding surface 2a of blade shoe 2 pressure-contacts the chain so that blade shoe 2 deforms to a flatter shape and thereby projecting portion 21 at the tip slides on sliding surface 41 of base 4, while blade shoe 2 rotates around pin 5. Each blade spring 3 deforms similarly when blade shoe 2 deforms and the elastic repulsive force of these blade springs acts 3 on the chain via blade shoe 2.

Proximal groove 22a, formed in projecting portion 22 on the fixed end blade shoe 2, extends to the attachment point of pin 5 and further toward the tip 22b of projecting portion 22. Thereby, the degree of opening of opening B of proximal groove 22a does not change greatly when blade shoe 2 deforms. As a result, change of the contact point between proximal groove 22a and blade spring 3 is reduced. In this manner, deterioration of response of blade tensioner 1 is reduced. In this case, generation of excessive bending stress in blade shoe 2 is prevented, so that the durability of blade tensioner 1 is improved.

Distal groove 21a, formed in projecting portion 21 on the free end of blade shoe 2, extends beyond contact point 21c of projecting portion 21 with sliding surface 41 to the tip part 21b of projecting portion 21. Thereby, change of the contact point of end part 3a of blade spring 3 with groove 21a reduced even when the degree of opening C of groove 21 on the tip side of blade shoe 2 changes. As a result, the adverse effect on the operation of blade shoe 2 is reduced and deterioration of response of blade tensioner 1 is reduced.

In addition, the opening of opening B on the fixed end of proximal groove 22a of blade shoe 2 can be reduced when blade shoe 2 deforms because contact point 22g of blade spring 3, with groove 22a, in groove 22a, that is formed in projecting portion 22 on the fixed end of blade shoe 2, is located more toward the tip portion 22b of projecting portion 22 than the pin attachment point.

Similarly, contact point 21g, of blade spring 3 with distal groove 21a, in groove 21a, that is formed in projecting portion 21 on the free end of blade shoe 2, is located more toward the tip 21b of projecting portion 21 than contact point 21c of projecting portion 21 with sliding surface 41. Therefore, the opening of opening C of groove 21a on the tip side of blade shoe 2 is reduced, when blade shoe 2 deforms.

FIG. 3 includes lines E and F to illustrate defined points on the tensioner shoe beyond which the grooves extend in a longitudinal direction. In particular, line E is a line perpendicular to the chain-contacting surface 2a of the shoe 2 which passes through the center of pin 5. The groove 22a extends past line E towards the tip of the shoe shown at 22b. Similarly, line F is a line perpendicular to the chain-contacting surface 2a of the shoe 2 which passes through point 21c where the free end of the shoe contacts the face 41 of the base 4. The groove 21a extends past line F towards the tip of the shoe shown at 21b.

In addition, formation of concave relief parts 21e, 22e in each groove 21a, 22a of blade shoe 2 prevents interference of ends 3a, 3b of blade spring 3 with blade shoe 2. The concave relief parts are channels formed in the shoe ends transverse to the longitudinal direction of the shoe. Thereby, operation of blade spring 3 during operation of the blade tensioner 1 is improved and deterioration of response of the blade tensioner 1 is reduced. Also, in such case, wear on the contact point of blade shoe 2 with blade spring ends 3a, 3b is prevented and, as a result, the durability of the blade tensioner 1 is improved.

As detailed above, the proximal groove in the fixed end of the blade shoe extends beyond the pin attachment point toward the tip of the fixed end of the blade tensioner of this invention. Thus, the change in the degree of opening of the opening of the groove is reduced when the blade shoe deforms. As a result, deterioration of response of the blade tensioner is reduced and, in addition, in such a case, generation of excessive bending stress on the blade shoe is reduced to obtain improved durability of the blade tensioner.

In the blade tensioner of the present invention, the distal groove on the free end of the blade shoe extends beyond the contact point between the free end and the sliding surface toward the tip of the shoe. Thus, the change of the contact point between the tip of the blade spring and the groove is reduced for the distal groove on the free end of the blade shoe, even when the degree of opening of the distal groove is changed. Thereby, an adverse effect on the operation of the blade shoe and deterioration of the response of the blade tensioner is reduced.

While several embodiments of the invention are illustrated, it will be understood that the invention is not limited to these embodiments. Those skilled in the art to which the invention pertains may make modifications and other embodiments employing the principles of this invention, particularly upon considering the foregoing teachings.

What is claimed is:

1. A blade tensioner comprising:
    a base having a face;
    an arcuately shaped shoe having a first side with a face for sliding engagement with an associated chain, said shoe having a fixed end, said fixed end being fixed to and rotatable around a pin fixed on said base and said shoe having a free end opposite said fixed end, said free end of said shoe being in sliding contact with said face formed on said base;
    a blade spring provided along said shoe on an opposite side of said shoe, said blade spring having end portions, said end portions of said blade spring being inserted into grooves formed respectively at said fixed end and said free end of said shoe, said groove of said fixed end of said shoe extending toward a tip of said fixed end beyond said pin;
    wherein said groove of said fixed end of said shoe extends beyond a line (E) drawn perpendicular to said face of said shoe through the center of said pin;
    wherein said blade spring contacts an end of said groove of said fixed end of said shoe at a point toward said tip of said fixed end beyond said pin;
    wherein said fixed end and said free end each have a channel formed therein adjacent said blade spring ends, said channel extending in a direction transverse to the longitudinal axis of said shoe;

wherein a guide is provided on the slide face of said base adjacent to said free end of said shoe to guide the travel of the free end of said shoe; and wherein said guide is provided with a pair of elements, said elements being located on opposite edges of said slide face, each of said elements of said guide having a convex curved face adjacent said edges of said free end of said shoe.

2. The blade tensioner of claim 1, wherein a concave opening extending in a direction transverse to the longitudinal axis of said shoe is formed on said fixed end and said free end.

3. The blade tensioner of claim 2, wherein said concave opening is filled with fiber-reinforced plastics.

4. A blade tensioner comprising:

a base having a face;

an arcuately shaped shoe having a first side with a face for sliding engagement with an associated chain, said shoe having a fixed end, said fixed end being fixed to and rotatable around a pin fixed on said base and said shoe having a free end opposite said fixed end, said free end of said shoe being in sliding contact with said face formed on said base;

a blade spring provided along said shoe on an opposite side of said shoe, said blade spring having end portions, said end portions of said blade spring being inserted into grooves formed respectively at said fixed end and said free end of said shoe, said groove of said fixed end of said shoe extending toward a tip of said fixed end beyond said pin, wherein said groove of said free end of said shoe extends toward said tip of said free end beyond a contact point between said free end and said slide face;

wherein said groove of said free end of said shoe extends toward said tip of said free end beyond a line (F) drawn perpendicular to said face of said shoe through said contact point;

wherein said blade spring contacts said groove of said free end of said shoe at a point toward said tip of said free end beyond said contact point between said free end and said slide face;

wherein said fixed end and said free end each have a channel formed therein adjacent said blade spring ends, said channel extending in a direction transverse to the longitudinal axis of said shoe;

wherein a guide is provided on the slide face of said base adjacent to said free end of said shoe to guide the travel of the free end of said shoe; and wherein said guide is provided with a pair of elements, said elements being located on opposite edges of said free end of said shoe, each of said elements having a convex curved face adjacent said edges of said free end of said shoe.

5. The blade tensioner of claim 4, wherein a concave opening extending in a direction transverse to the longitudinal axis of said shoe is formed on said fixed end and said free end.

6. The blade tensioner of claim 5, wherein said concave opening is filled with fiber-reinforced plastics.

* * * * *